No. 772,756. PATENTED OCT. 18, 1904.
O. THIBAULT.
COVER FOR DAIRY PRODUCTS.
APPLICATION FILED MAY 12, 1904.
NO MODEL.
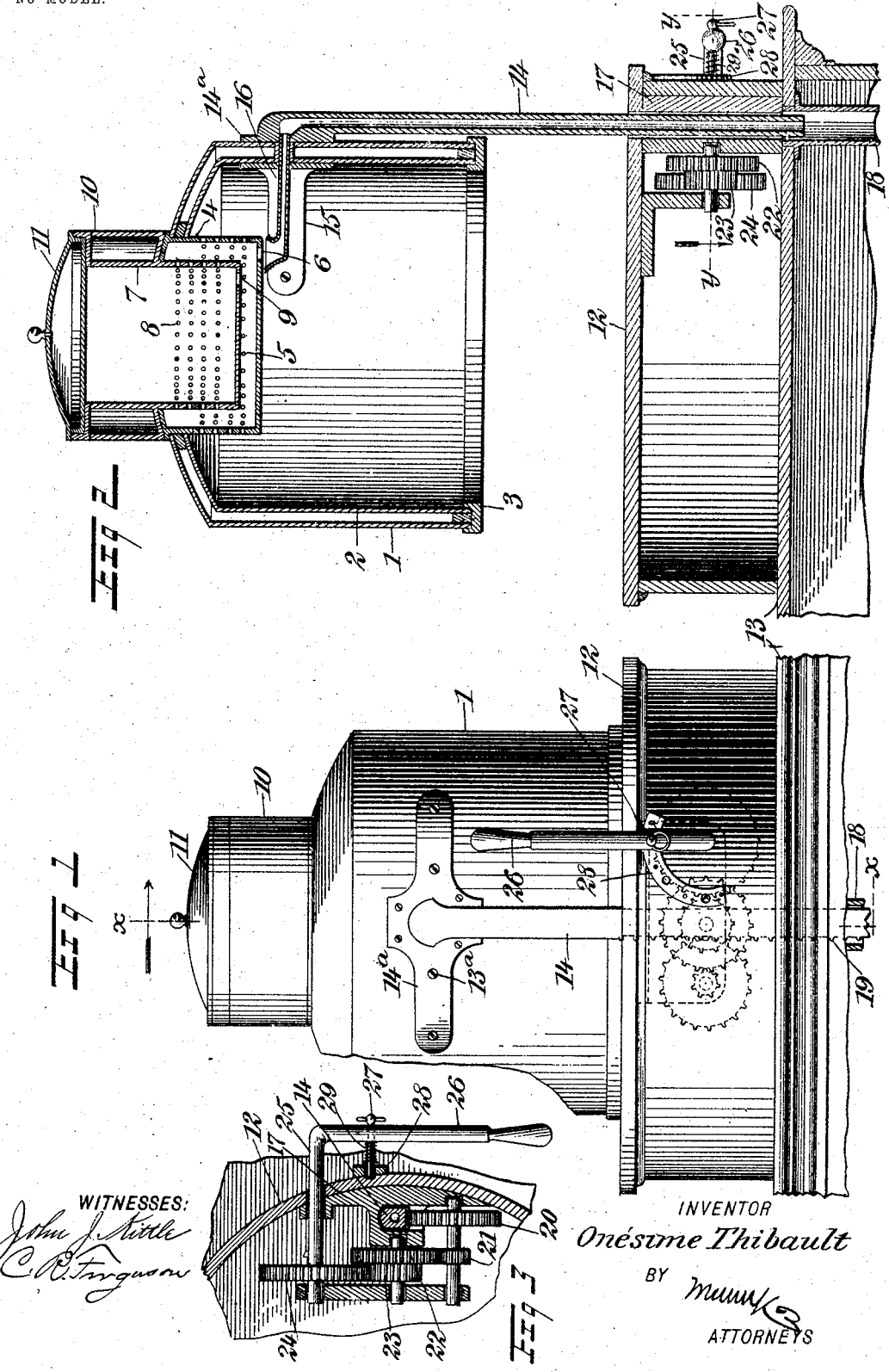
INVENTOR
Onésime Thibault
BY
ATTORNEYS
WITNESSES:

No. 772,756.

Patented October 18, 1904.

UNITED STATES PATENT OFFICE.

ONÉSIME THIBAULT, OF FALL RIVER, MASSACHUSETTS.

COVER FOR DAIRY PRODUCTS.

SPECIFICATION forming part of Letters Patent No. 772,756, dated October 18, 1904.

Application filed May 12, 1904. Serial No. 207,567. (No model.)

*To all whom it may concern:*

Be it known that I, ONÉSIME THIBAULT, a citizen of the United States, and a resident of Fall River, in the county of Bristol and State of Massachusetts, have invented a new and Improved Cover for Dairy Products, of which the following is a full, clear, and exact description.

This invention relates to improvements in covers for incasing cheese, butter, or other dairy products, the object being to provide a device of this character that will fully protect the products from dust and dirt when lowered and having a means for refrigeration during warm weather and also having a simple means for raising and lowering the cover.

I will describe a cover for dairy products embodying my invention and then point out the novel features in the appended claims.
Reference is to be had to the accompanying drawings, forming a part of this specification, in which similar characters of reference indicate corresponding parts in all the figures.

Figure 1 is an elevation of a cover embodying my invention. Fig. 2 is a section on the line $x\ x$ of Fig. 1, and Fig. 3 is a section on the line $y\ y$ of Fig. 2.

The cover, which consists of any suitable material—such, for instance, as glass or metal—comprises an outer wall 1 and an inner wall 2, these walls being spaced apart to form an air-chamber, the air in the same serving as an insulation from heat. Extended around the lower end of the cover is a cushion-band 3, consisting of rubber or the like, to prevent undue jar of the cover upon striking the base, to be hereinafter described.

Movably arranged in the top opening of the cover is a tray 4, having perforations 5 in its side wall and having an outlet 6 through the bottom, and removably arranged in the tray 4 is an ice-receptacle 7, the lower portion of which is extended into the tray, and this portion is provided with perforations 8, and the bottom of the ice-receptacle is provided with an outlet 9. Spaced from the inner wall of the receptacle at the portion above the tray is an outer wall 10, the space between which and the inner wall forms an air-chamber. This ice-receptacle is provided with a cover 11, which is designed to fit in the opening in the top of the main cover when the refrigerating device is not desired for use.

Arranged underneath the cover is a box-like base 12, which may be secured to any suitable support—such, for instance, as to a counter 13. A tubular rod 14 is connected to the main cover, as here shown, by means of screw-bolts $13^a$ passing through an outer plate $14^a$ and an inner plate 15, the said rod being practically a portion of the outer plate $14^a$. A drain-tube 16 is removably inserted through an opening in the main cover and communicates with an opening in the rod 14, and at its inner end the said tube is made funnel-shaped, this portion being directly under the outlet 6 of the tray.

The rod 14 is movable through an opening in the base 12 and through a channel in a block 17, secured in the box-like base, and this rod 14 is designed to discharge into a drain-pipe 18, secured to the counter and leading to any suitable place of discharge. Formed on one side of the rod 14 is a rack 19, engaged by a gear-wheel 20, on the shaft of which is a pinion 21, meshing with a gear-wheel 22, on the shaft of which is a pinion 23, engaging with a gear-wheel 24 on an operating-shaft 25, extended outward through the side wall of the box-like base, and on the outer end is an operating-lever 26. Obviously by shifting the lever 26 the cover may be raised and lowered through the medium of the train of gearing, and the cover may be held at any desired elevation by engaging a pin 27, carried by the lever 26, in any one of a series of holes formed in a segment-plate 28. The pin 27 is pressed inward by means, as here shown, of a spring 29.

In the operation in warm weather the refrigerating device will be placed in position, as indicated in the drawings. The air circulating around the ice-receptacle and within the tray will keep the cheese or other product cool, and the air in the chamber surrounding the upper portion of the receptacle will protect the ice from undue heat. It will be noted that the cover 11 is also provided with an air-space; but this is not absolutely necessary.
The drainings will pass off through the tube 16 and the rod 14. It will be noted that the rod 14 is flattened on its opposite sides, so as to engage slidably against the walls of the block 17, and by this construction rotary movement will be prevented.

Having thus described my invention, I claim as new and desire to secure by Letters Patent—

1. In a device for the purpose specified, a cover consisting of inner and outer walls spaced apart to form an air-chamber, a base, a tubular rod secured to the cover and movable through said base, and a gearing for operating said rod.

2. In a device of the character described, a cover having an opening at its top, an ice-receptacle removably arranged in said opening, a base, a tubular rod connected to the cover and movable through said base, means for raising and lowering the rod, and a drain-tube for carrying water from the ice-receptacle to said rod.

3. A device for the purpose specified, comprising a cover having an opening at the top, a tray adapted to be seated in said opening and having its side wall perforated, and also having an opening in the bottom, an ice-receptacle having its lower portion extended into said tray, the side wall thereof being perforated, an outer wall around the upper portion of the receptacle and spaced therefrom to form an air-chamber, a removable cover for the receptacle adapted to fit the opening of the first-named cover, a base, a tubular rod movable through said base and connected to the first-named cover, a tube removably arranged in a perforation in said cover and communicating with the interior of the tubular rod for carrying water discharged from the tray to said rod, and means for raising and lowering the rod.

4. A device for the purpose specified comprising a cover consisting of inner and outer walls spaced apart to form an air-chamber, said cover having an opening at the top, a tray removably arranged in said opening, the side wall thereof being perforated and the bottom thereof having an opening, an ice-receptacle removably placed in said tray, the portion of said receptacle in the tray being perforated, an air-chamber surrounding the upper portion of the receptacle, a cover for the receptacle, a base, a tubular rod connected to the first-named cover and movable vertically through said base, a gearing for raising and lowering the rod, and means for holding the same as adjusted.

5. In a device for the purpose specified, a cover, a base, a rod attached to the cover and movable through said base, the said rod being tubular, a block in the base having a channel through which the rod slides, a rack formed on one side of said rod, an operating-shaft, gear connections between said shaft and said rack, a lever on the shaft, a locking member carried by the lever, and a locking member on the base for engagement with the first-named locking member.

In testimony whereof I have signed my name to this specification in the presence of two subscribing witnesses.

ONÉSIME THIBAULT.

Witnesses:
CATHERINE A. SHAUGHNESSY,
ADOLPHE BLAIR.